US010735742B2

(12) United States Patent
Petajan et al.

(10) Patent No.: US 10,735,742 B2
(45) Date of Patent: Aug. 4, 2020

(54) ADAPTIVE BITRATE VIDEO TESTING

(71) Applicant: AT&T Intellectual Property I, L.P., Atlanta, GA (US)

(72) Inventors: Eric Petajan, Watchung, NJ (US); Subhabrata Sen, Westfield, NJ (US); Emir Halepovic, Somerset, NJ (US); Shichang Xu, Ann Arbor, MI (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 0 days.

(21) Appl. No.: 16/202,724

(22) Filed: Nov. 28, 2018

(65) Prior Publication Data

US 2020/0169736 A1  May 28, 2020

(51) Int. Cl.
| | | |
|---|---|---|
| H04N 19/172 | (2014.01) | |
| H04N 19/154 | (2014.01) | |
| H04N 19/115 | (2014.01) | |

(52) U.S. Cl.
CPC ......... *H04N 19/154* (2014.11); *H04N 19/115* (2014.11); *H04N 19/172* (2014.11)

(58) Field of Classification Search
None
See application file for complete search history.

(56) References Cited

U.S. PATENT DOCUMENTS 6,944,225 B2 * 9/2005 Li .................... H04N 19/63
375/240.18
7,844,992 B2 * 11/2010 Boyce .............. H04N 21/23439
725/91

(Continued)

FOREIGN PATENT DOCUMENTS

CN    103281555 B    6/2015
EP    2736261 A1    5/2014
(Continued)

OTHER PUBLICATIONS

De Simone, Francesca, et al. "A H. 264/AVC video database for the evaluation of quality metrics." Acoustics Speech and Signal Processing (ICASSP), 2010 IEEE International Conference, IEEE, 2010. https://www.researchgate.net/publication/224150805_A_H264AVC_video_database_for_the_evaluation_of_quality_metrics.

(Continued)

*Primary Examiner* — Shadan E Haghani

(57) ABSTRACT

A processing system may obtain a first frame of a first variant associated with a reference copy of a video, where a plurality of variants comprises copies of the video encoded at different bitrates, determine a frame number of the first frame from a visual overlay containing the first frame number, calculate a first image distance between the first frame and a frame of the reference copy having the frame number, determine, from among a plurality of image distances for frames of each variant having the frame number, a closest image distance to the first image distance, the plurality of image distances comprising image distances between frames of the variants and the frame of the reference copy having the frame number, and identify the first frame as being from the first variant in accordance with a variant associated with the first closest image distance.

20 Claims, 4 Drawing Sheets

(56) References Cited

U.S. PATENT DOCUMENTS

| | | | |
|---|---|---|---|
| 8,131,068 B2* | 3/2012 | Abe | G06K 9/4652 |
| | | | 348/453 |
| 8,253,803 B2 | 8/2012 | Okamoto et al. | |
| 8,441,955 B2 | 5/2013 | Wilkinson et al. | |
| 8,456,531 B2 | 6/2013 | Winkler | |
| 8,520,075 B2 | 8/2013 | Bhagavathy et al. | |
| 8,695,051 B2 | 4/2014 | Nakamichi et al. | |
| 8,793,751 B2 | 7/2014 | Skelly | |
| 8,897,144 B2 | 11/2014 | Hui et al. | |
| 9,060,191 B2 | 6/2015 | Chhaochharia et al. | |
| 9,191,284 B2 | 11/2015 | Kordasiewicz et al. | |
| 9,264,475 B2 | 2/2016 | Shivadas et al. | |
| 9,479,562 B2 | 10/2016 | Funge et al. | |
| 9,641,904 B2 | 5/2017 | Dunne et al. | |
| 10,015,503 B1 | 7/2018 | Ahammad | |
| 10,070,156 B2 | 9/2018 | Horev et al. | |
| 10,163,221 B1* | 12/2018 | Decker | G06T 7/12 |
| 2003/0123737 A1* | 7/2003 | Mojsilovic | G06K 9/626 |
| | | | 382/224 |
| 2013/0188060 A1 | 7/2013 | Steinberg et al. | |
| 2013/0297743 A1 | 11/2013 | Eschet et al. | |
| 2016/0105728 A1 | 4/2016 | Schmidmer et al. | |
| 2017/0147170 A1* | 5/2017 | Hellier | G06F 3/0482 |
| 2018/0020036 A1 | 1/2018 | Ramamurthy et al. | |
| 2018/0041788 A1 | 2/2018 | Wang et al. | |
| 2018/0115475 A1 | 4/2018 | Broom et al. | |
| 2018/0158184 A1 | 6/2018 | Aydin et al. | |

FOREIGN PATENT DOCUMENTS

| | | |
|---|---|---|
| WO | 2002085033 A2 | 10/2002 |
| WO | 2017152274 A1 | 9/2017 |

OTHER PUBLICATIONS

Georgopoulos, Panagiotis, et al. "Towards network-wide QoE fairness using openflow-assisted adaptive video streaming." Proceedings of the 2013 ACM SIGCOMM workshop on Future human-centric multimedia networking. ACM, 2013. http://conferences.sigcomm.org/sigcomm/2013/papers/fhmn/p15.pdf.

Søgaard, Jacob, Søren Forchhammer, and Kjell Brunnström. "Quality assessment of adaptive bitrate videos using image metrics and machine learning." Quality of Multimedia Experience (QoMEX), 2015 Seventh International Workshop, IEEE, 2015. http://orbit.dtu.dk/files/110949321/paper_abr_revised.pdf.

Duanmu, Zhengfang, et al. "A quality-of-experience index for streaming video." IEEE Journal of Selected Topics in Signal Processing 11.1 (2017): 154-166. https://ece.uwaterloo.ca/~zduanmu/jstsp16qoe/paper/jstsp16_qoe.pdf.

\* cited by examiner

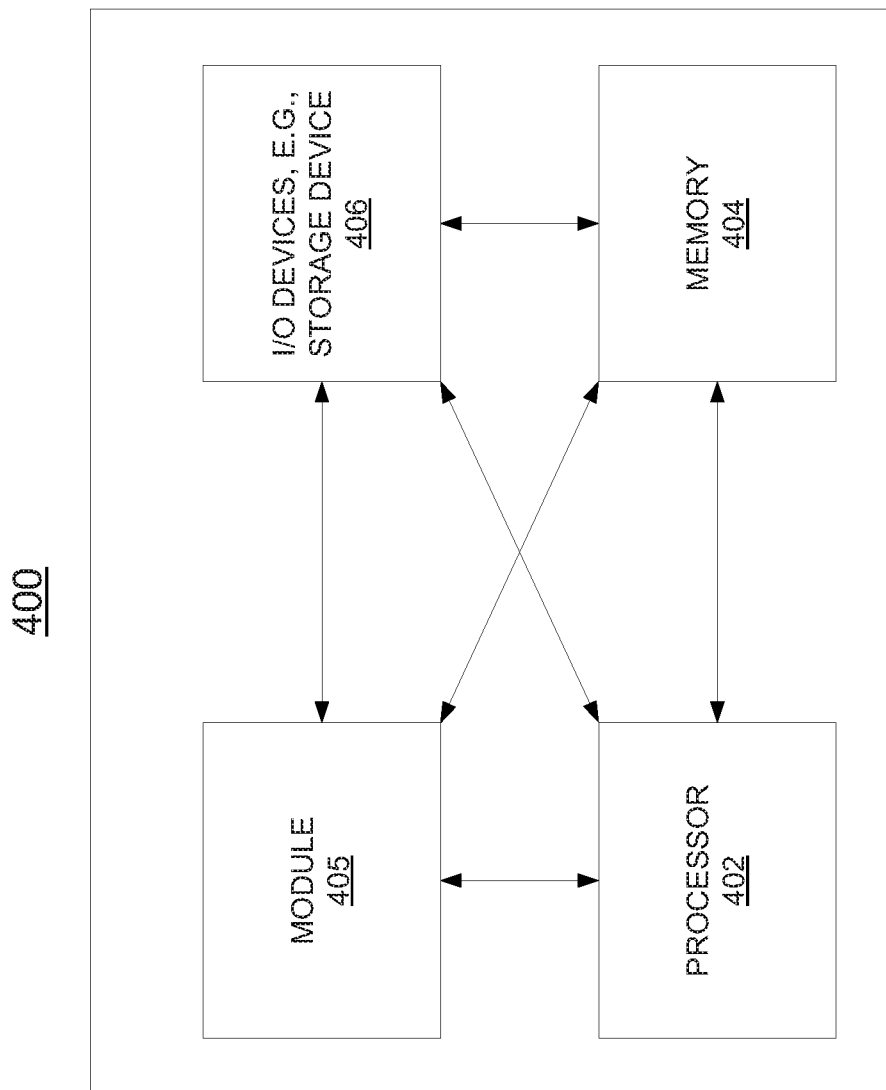

ADAPTIVE BITRATE VIDEO TESTING

The present disclosure relates generally to adaptive bitrate streaming videos, and more particularly to devices, non-transitory computer-readable media, and methods for determining a bitrate variant of a semi-annotated video.

BRIEF DESCRIPTION OF THE DRAWINGS

The teachings of the present disclosure can be readily understood by considering the following detailed description in conjunction with the accompanying drawings, in which:

FIG. 4 illustrates a high level block diagram of a computing device specifically programmed to perform the steps, functions, blocks and/or operations described herein.

To facilitate understanding, identical reference numerals have been used, where possible, to designate identical elements that are common to the figures.

DETAILED DESCRIPTION

Figure 1:
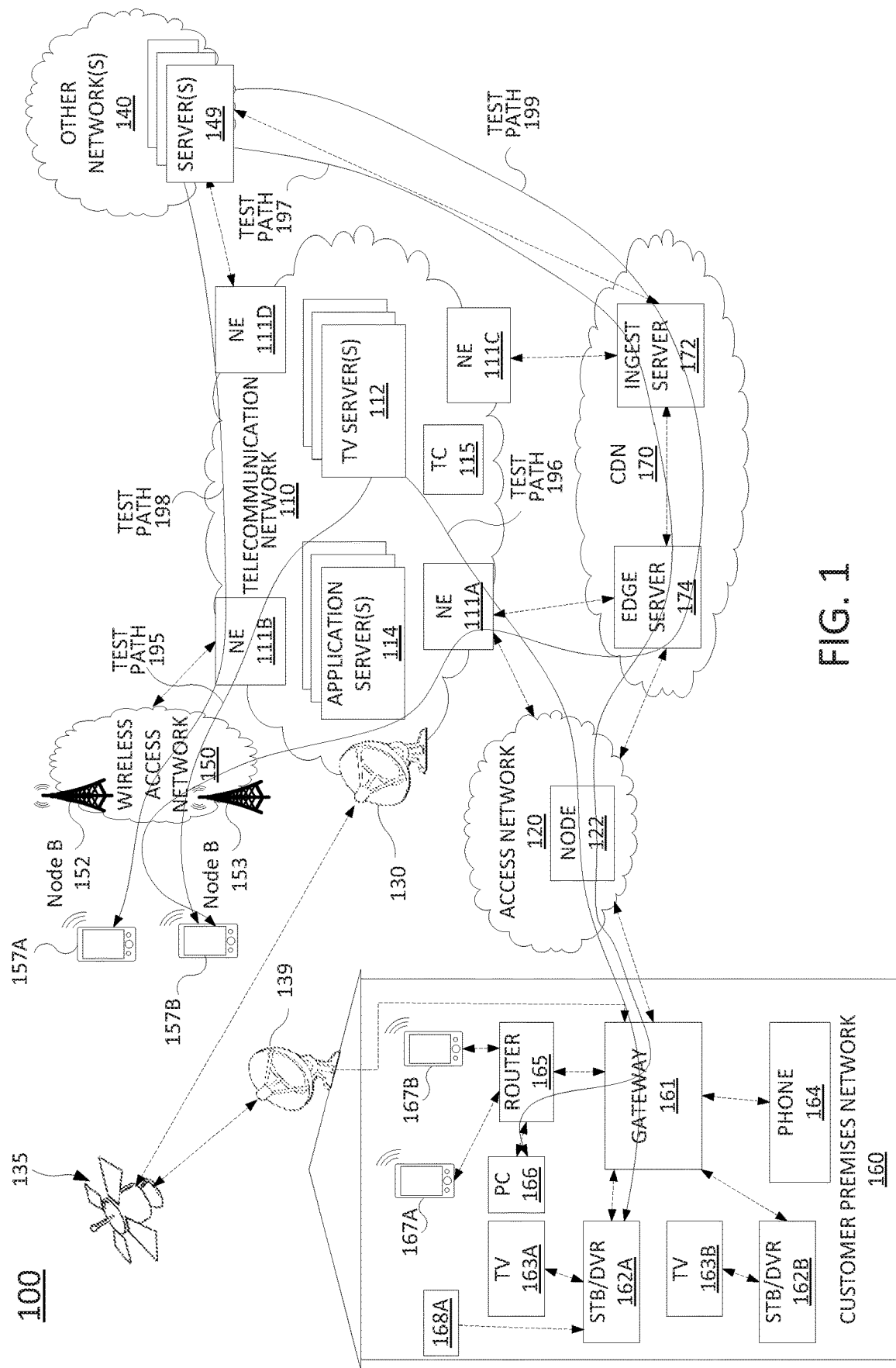
FIG. 1 illustrates an example network related to the present disclosure.

In one example, the present disclosure describes a device, computer-readable medium, and method for determining a bitrate variant of a semi-annotated video. For instance, a processing system including at least one processor may obtain a first frame of a first one of a plurality of variants associated with a reference copy of a video. The plurality of variants may comprise a plurality of copies of the video encoded at different bitrates. The processing system may further determine a first frame number of the first frame from a visual overlay of the first frame containing the first frame number, calculate a first image distance between the first frame and a frame of the reference copy having the first frame number, and determine, from among a plurality of image distances for frames of each of the plurality of variants having the first frame number, a first closest image distance to the first image distance, where the plurality of image distances comprises image distances between frames of the plurality of variants having the first frame number and the frame of the reference copy having the first frame number. The processing system may then identify the first frame as being from the first one of the plurality of variants in accordance with a variant associated with the first closest image distance that is determined.

Video delivery technology has shifted from protocols such as Real Time Messaging Protocol (RTMP) and Real Time Streaming Protocol (RTSP) to Hypertext Transfer Protocol (HTTP)-based, adaptive streaming protocols, such as Moving Picture Experts Group (MPEG) Dynamic Adaptive Streaming over HTTP (DASH). A feature of HTTP-based adaptive streaming protocols is the availability of video in multiple chunks associated with each time block of a video and having different encoding bitrates, with the chunks linked together by a manifest file, or "index file" that defines all of the variants/tracks (e.g., respective sets of chunks, each set at a different bitrate/encoding level) of the video.

In one example, a video chunk (broadly a "chunk") may comprise a sequence of video and/or audio frames for a time block of a video that is encoded at a particular bitrate (e.g., a target bitrate, or "encoding level"). In one example, a chunk may be referred to as a segment, when the chunks of an adaptive bitrate video are stored as individual data files separate from other chunks. In such an example, the chunk (e.g., a segment) may be obtained by a requesting device, such as a player device, via a uniform resource locator (URL) identifying a file containing the chunk. In another example, a chunk may be stored and/or made available as a portion of a file which may contain multiple chunks or even an entire variant/track. In this case, the chunk be referred to as a "fragment." In addition, such a chunk (e.g., a fragment) may be obtained via a URL identifying the file containing the chunk and a byte range, timestamp, index, sequence number, or the like to distinguish the chunk from other chunks in the same file. The URL(s) and other information that may be used by a player device to request and obtain chunks of an adaptive bitrate video may be stored in a manifest file which may be obtained by the player device in advance of a streaming session.

A time block of an adaptive bitrate video may have multiple associated chunks at respective bitrates. In particular, each of these associated chunks may be of a respective variant for the video. In addition, each variant may comprise a set of chunks encoded at a same bitrate (e.g., a target bitrate) and covering successive time blocks so as to constitute a complete copy of the video at the (target) bitrate for that variant. The time blocks may have a duration that is defined in advance in accordance with an adaptive bitrate protocol and/or set according to a preference of a video player vendor, a video service provider, a network operator, a video creator, a transcoder vendor, and so forth. In one example, chunks may be associated with particular time blocks of a video via sequence numbers, index numbers/indices, or the like which indicate a relative (temporal) order of the time blocks within the overall video. For instance, time block indicators for each available chunk may be included in the manifest file so that a player device may determine which chunks may be requested for each time block and so that the player device may determine which chunk(s) to request next (e.g., for successive time blocks).

A variety of factors may affect users' quality of experience for video streaming. These include video stalls, startup delay, and poor video/audio quality. Adaptive bitrate (ABR) streaming over HTTP is adopted since it offers significant advantages in terms of both user-perceived quality and resource utilization efficiency for content and network service providers. Unlike video downloads that must be completed fully before playback can begin, streaming video starts playing within seconds. With ABR-based streaming, each video is encoded at a number of different quality levels (called variants) and stored on servers as separate files. A video client running on a mobile device, home television, game console, web browser, etc. chooses which quality level to stream by monitoring network conditions and estimating the available network capacity.

The function of the ABR algorithm is to select ABR variants, or "bitrate variants" (called representations in DASH) in real time to maximize video quality and minimize re-buffering events. Typically, a video client maintains a media cache (also referred to as a "buffer" or "video buffer"), by pre-fetching video chunks, then playback occurs from the cache. For each time block of a video-on-demand (VoD) program/live channel, the video client selects which variant from which to download a chunk into the cache.

Higher quality chunks for a given time block are larger in size (data volume) and take longer to download than lower quality chunks. In general, the goal is to download as high a quality chunk as possible each time while keeping the buffer from going empty.

One approach to variant or chunk selection is channel capacity estimation, which uses chunk download time as an estimate of available channel bitrate. The video client selects a chunk of a variant having a bitrate/encoding level that most closely matches the channel bitrate without exceeding it. In an environment where throughput is highly variable, such as a mobile network, accurate estimation of future channel capacity is challenging.

Another approach uses a current buffer level (e.g., a measure of an amount of time of video stored in the buffer to be played out), instead of estimated channel bandwidth, to select the bitrate/encoding level of the next chunk. As with capacity estimation, the objective is to balance the flow of data into the buffer with the outflow, to keep the buffer from going empty or overflowing. Unlike with channel capacity estimation, for buffer occupancy-based approach, the actual buffer level is used to select the next chunk, e.g., with a linear, or approximately linear, mapping function. The higher the current buffer level, the higher the bitrate selected for the next chunk for the next time block, and vice versa: the lower the buffer level, the lower the variant bitrate selected for the next chunk. This ensures conservative behavior, e.g., selecting minimum quality/chunk data volume, when the buffer is low, i.e., filling the buffer more quickly using a chunk of a lower bitrate variant and aggressive behavior, e.g., selecting maximum quality/chunk data volume, when the buffer is full or nearly so, i.e., filling the buffer more slowly using a chunk of a higher bitrate variant. In response to bandwidth drops and/or buffer depletion, a client may request a chunk for the same time block at a lower quality level (lower bitrate variant) and may discard the partially downloaded chunk, which results in bandwidth waste. This also increases the chance of playback stalls, and leads to a lower average bitrate of the chunks downloaded and more frequent quality switches.

A measure for how efficiently an ABR video stream is delivered and for the quality in which the stream is being presented on the screen of a device can be referred to as a "Quality of Experience" (QoE). If the video quality of an ABR video stream is too high (e.g., maximum spatial resolution, frame rate, etc.), then delivery quality may suffer (e.g., increased video startup time, frequency and duration of stalls during playback to allow for buffering, etc.). As such, network service providers that provide and/or facilitate delivery of ABR video streams seek to balance video quality with delivery quality, thereby mitigating waste of network resources while maintaining a QoE that is acceptable to the user. In one example, QoE monitoring and testing may utilize comparisons between a video stream received at a video player device and a source video and/or a reference video to be used as a baseline for QoE analysis. In accordance with the present disclosure, a reference video may comprise the source video or may comprise a copy of the source video that may be modified (e.g., for color correction/enhancement, noise reduction, compression, etc.) or that may be unmodified.

Examples of the present disclosure may include a test system that may make changes to the bitrate variants of a video and the delivery of chunks of different variants of the video over a network, and which may observe the effects of the changes in QoE measures (e.g., performance indicators or "key performance indicators" (KPIs)) for the video stream(s) received at one or more test devices (e.g., comprising receivers/video players). For instance, in one example, a test system may include the transcoders for creating bitrate variants of a video and segmenting the bitrate variants into chunks. In one example, the test system may alternatively or additionally include network controllers (such as one or more software defined network (SDN) controllers, content distribution network (CDN) orchestrators, etc.) that can be controlled to alter the manner in which chunks of the variants are delivered to test devices. Examples of the present disclosure may also be used to observe differences in performance measures among different delivery networks or delivery services for the same videos. The performance measures may include a video quality (VQ), such as a spatial resolution, a frame rate, a compression artifacts measure, a pixel depth, etc., and delivery quality (DQ) measures, such as a video startup time, a video stall measure, a rate switching measure, a latency measure, etc.

In one example, the present disclosure relates to testing with a semi-annotated video. For instance, for a fully annotated video, frames may be overlaid with a frame number and an identifier of the variant (encoding level). An unannotated video may have no overlay. In contrast, a semi-annotated video may include a frame number overlay, but omit the variant, or encoding quality level, identification. The use of frame number visual overlays allows for efficient alignment between frames of a reference copy of a video and the frames of a particular bitrate variant/chunk of the video that may be received and played out at a video player. For instance, certain services involve the insertion of advertisements or other content between portions of the video comprising the original content, such that the timing information or frame metadata may be mismatched. However, for a test video, if the frame numbers are inserted in each frame as a visual overlay, the frame numbers may be displayed on-screen when rendered at a player device. In addition, the frame numbers may be determined by performing an optical character recognition (OCR) on portions of the frames that are recorded by a screen capture process that may be running on the player device. If frame numbers are not included (e.g., for unannotated video streaming) frame alignment between the frames of a received video chunk and corresponding frames of the reference video may still be performed, but may include more substantial computations. For example, one technique may include a frame-by-frame comparison to determine the best match between visual features of the received frame and the frames of the reference video.

If a frame overly also includes a variant identifier, it is possible to associate a QoE measure with the particular variant, e.g., for the entire video stream that is received or at least a portion thereof that may be associated with the frame, or a chunk or time block including the frame. A variant identifier for a current frame may also be used to determine when bitrate switching between bitrate variants for chunks of subsequent time blocks is occurring and to associate the bitrate switching with buffer occupancy levels, network bandwidth estimates, and so forth.

In some instances, a test system may not include the transcoders for creating variants and/or the packagers for segmenting the variants into chunks. Therefore, it may not be possible to overlay the variant identifier over the frames of each chunk that is created. Nevertheless, the variant for the frame (and hence for the time block in which the frame is contained) may still be determined as described herein. For instance, in one example the distance (e.g., an average pixel distance) between each reference/highest quality frame and the corresponding frames from each variant is computed. In addition, these distances may be stored (e.g., in one or more lookup tables) indexed by frame number. The frame number may be recognized automatically from screen-captured video of the player screen. The variant with the closest distance to the unknown frame is chosen as the estimated variant for the unknown frame. In one example, frame rate may also be estimated from sampling a plurality of frames around the unknown frame. The frame rate may then be used to further refine the variant estimate. For instance, variant frame rates may be known in advance. Notably, the automatic estimation of the variant of a frame without overlay allows for QoE testing and measurements which involve delivery of ABR videos created via transcoders that do not support per-variant overlay, or external services that do not provide access to transcoders.

Examples of the present disclosure may be utilized in lab testing, delivery of ABR streaming video to smart TVs, set-top-boxes, personal computers, and the like at customer premises, and in drive testing environments for cellular and non-cellular wireless delivery of ABR streaming video to mobile devices, such as smartphones, laptop computers, tablet computers, and the like. Accurate objective measurement of video quality and delivery quality enables total streaming system tuning. For example, limiting the visual quality of the highest quality ABR variant/track to sufficient levels saves mobile data use and may improve delivery quality (e.g., reduced startup time and stalls).

Examples, of the present disclosure may be practically implemented within any existing HAS system. It should also be noted that although examples of the present disclosure are described primarily in connection with a video client and video streaming, examples of the present disclosure may be similarly applied to other types of streaming media, such as adaptive bitrate streaming audio. In addition, although aspects of the present disclosure may be most applicable in the context of live streaming with shallow buffers, the present disclosure may be equally applicable to on-demand streaming of recorded programs. For instance, examples of the present disclosure may be particularly useful for QoE measurements for live video, where variants and/or chunks may only be available for a short period of time on one or more network-based servers, and/or where estimating a video quality measure from the determined variant/encoding level may be faster and more computationally efficient than calculating the visual quality directly from the received video frames. These and other aspects of the present disclosure are described in greater detail below in connection with the examples of FIGS. 1-4.

To better understand the present disclosure, FIG. 1 illustrates an example system 100 (e.g., comprising one or more networks), related to the present disclosure. As shown in FIG. 1, the system 100 connects mobile devices 157A, 157B, 167A and 167B, and home network devices such as home gateway 161, set-top boxes (STBs) 162A and 162B, television (TV) 163A and TV 163B, phone 164, router 165, personal computer (PC) 166, and so forth, with one another and with various other devices via a telecommunication network 110, a wireless access network 150 (e.g., a cellular network), an access network 120, other networks 140, content distribution network (CDN) 170, and/or the Internet in general. For instance, connections between telecommunication network 110, access network 120, customer premises network 160 (e.g., a home network, an enterprise network, etc.), CDN 170, wireless access network 150 and other networks 140 may comprise the Internet in general, internal links under the control of a single telecommunication service provider network, links between peer networks, and so forth.

In one example, wireless access network 150 may comprise a radio access network implementing such technologies as: Global System for Mobile Communication (GSM), e.g., a Base Station Subsystem (BSS), or IS-95, a Universal Mobile Telecommunications System (UMTS) network employing Wideband Code Division Multiple Access (WCDMA), or a CDMA3000 network, among others. In other words, wireless access network 150 may comprise an access network in accordance with any "second generation" (2G), "third generation" (3G), "fourth generation" (4G), Long Term Evolution (LTE), "fifth generation" (5G) or any other yet to be developed future wireless/cellular network technology. While the present disclosure is not limited to any particular type of wireless access network, in the illustrative example, wireless access network 150 is shown as a UMTS terrestrial radio access network (UTRAN) subsystem. Thus, elements 152 and 153 may each comprise a Node B or evolved Node B (eNodeB). In one example, wireless access network 150 may be controlled and/or operated by a same entity as telecommunication network 110.

In one example, each of the mobile devices 157A, 157B, 167A, and 167B may comprise any subscriber/customer endpoint device configured for wireless communication such as a laptop computer, a Wi-Fi device, a Personal Digital Assistant (PDA), a mobile phone, a smartphone, an email device, a computing tablet, a messaging device, and the like. In one example, any one or more of mobile devices 157A, 157B, 167A, and 167B may have both cellular and non-cellular access capabilities and may further have wired communication and networking capabilities. In one example, any one or more of mobile devices 157A, 157B, 167A, and 167B may comprise a test device (e.g., a receiver device/video player) for performing various operations in connection with examples of the present disclosure for determining a bitrate variant of a semi-annotated video.

As illustrated in FIG. 1, system 100 includes a telecommunication network 110. In one example, telecommunication network 110 may combine core network components of a cellular network with components of a triple play service network; where triple play services include telephone services, Internet or data services and television services to subscribers. For example, telecommunication network 110 may functionally comprise a fixed mobile convergence (FMC) network, e.g., an IP Multimedia Subsystem (IMS) network. In addition, telecommunication network 110 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Telecommunication network 110 may also further comprise a broadcast television network, e.g., a traditional cable provider network or an Internet Protocol Television (IPTV) network, as well as an Internet Service Provider (ISP) network. The network elements 111A-111D may serve as gateway servers or edge routers to interconnect the telecommunication network 110 with other networks 140, wireless access network 150, access network 120, and so forth. As shown in FIG. 1, telecommunication network 110 may also include a plurality of television (TV) servers 112, and a plurality of application servers 114.

In accordance with the present disclosure, telecommunication network 110 may also include a test controller (TC) 115 (e.g., a processing system comprising one or more servers) configured to perform various operations in connection with examples of the present disclosure for determining a bitrate variant of a semi-annotated video. In one example, test controller 115 may comprise all or a portion of a computing device or system, such as computing system 400, and/or processing system 402 as described in connection with FIG. 4 below, specifically configured to perform various steps, functions, and/or operations for determining a bitrate variant of a semi-annotated video, as described herein. The functionality of test controller 115 is described in greater detail below in connection with test systems that may include various test devices, ABR video source devices, and so forth.

In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 4 and discussed below) or multiple computing devices collectively configured to perform various steps, functions, and/or operations in accordance with the present disclosure. For ease of illustration, various additional elements of telecommunication network 110 are omitted from FIG. 1.

With respect to television service provider functions, telecommunication network 110 may include one or more television servers 112 for the delivery of television content, e.g., a broadcast server, a cable head-end, and so forth. For example, telecommunication network 110 may comprise a video super hub office, a video hub office and/or a service office/central office. In this regard, television servers 112 may include content server(s) to store scheduled television broadcast content for a number of television channels, video-on-demand (VoD) programming, local programming content, and so forth. Alternatively, or in addition, content providers may stream various contents to the telecommunication network 110 for distribution to various subscribers, e.g., for live content, such as news programming, sporting events, and the like. Television servers 112 may also include advertising server(s) to store a number of advertisements that can be selected for presentation to viewers, e.g., in the customer premises network 160 and at other downstream viewing locations. For example, advertisers may upload various advertising content to the telecommunication network 110 to be distributed to various viewers. Television servers 112 may also include interactive TV/video-on-demand (VoD) server(s) and/or network-based digital video recorder (DVR) servers, as described in greater detail below.

In one example, the access network 120 may comprise a Digital Subscriber Line (DSL) network, a broadband cable access network, a Local Area Network (LAN), a cellular or wireless access network, a 3$^{rd}$ party network, and the like. For example, the operator of telecommunication network 110 may provide a cable television service, an IPTV service, or any other types of television service to subscribers via access network 120. In this regard, access network 120 may include a node 122, e.g., a mini-fiber node (MFN), a video-ready access device (VRAD) or the like. However, in another example, node 122 may be omitted, e.g., for fiber-to-the-premises (FTTP) installations. Access network 120 may also transmit and receive communications between customer premises network 160 and telecommunication network 110 relating to voice telephone calls, communications with web servers via other networks 140, content distribution network (CDN) 170 and/or the Internet in general, and so forth. In another example, access network 120 may be operated by a different entity from telecommunication network 110, e.g., an Internet service provider (ISP) network.

Alternatively, or in addition, the system 100 may provide television services to customer premises network 160 via satellite broadcast. For instance, ground station 130 may receive television content from television servers 112 for uplink transmission to satellite 135. Accordingly, satellite 135 may receive television content from ground station 130 and may broadcast the television content to satellite receiver 139, e.g., a satellite link terrestrial antenna (including satellite dishes and antennas for downlink communications, or for both downlink and uplink communications), as well as to satellite receivers of other subscribers within a coverage area of satellite 135. In one example, satellite 135 may be controlled and/or operated by a same network service provider as the telecommunication network 110. In another example, satellite 135 may be controlled and/or operated by a different entity and may carry television broadcast signals on behalf of the telecommunication network 110.

As illustrated in FIG. 1, telecommunication network 110 may include various application servers 114. For instance, application servers 114 may be implemented to provide certain functions or features, e.g., a Serving-Call Session Control Function (S-CSCF), a Proxy—Call Session Control Function (P-CSCF), or an Interrogating—Call Session Control Function (I-CSCF), one or more billing servers for billing one or more services, including cellular data and telephony services, wire-line phone services, Internet access services, and television services. Application servers 114 may also include a Home Subscriber Server/Home Location Register (HSS/HLR) for tracking cellular subscriber device location and other functions. An HSS refers to a network element residing in the control plane of an IMS network that acts as a central repository of all customer specific authorizations, service profiles, preferences, etc. Application servers 114 may also include an IMS media server (MS) for handling and terminating media streams to provide services such as announcements, bridges, and Interactive Voice Response (IVR) messages for VoIP and cellular service applications. The MS may also interact with customers for media session management. In addition, application servers 114 may also include a presence server, e.g., for detecting a presence of a user. For example, the presence server may determine the physical location of a user or whether the user is "present" for the purpose of a subscribed service, e.g., online for a chatting service and the like. In one example, application servers 114 may include data storage servers to receive and store manifest files regarding adaptive bitrate streaming videos maintained within TV servers 112 and/or available to subscribers of telecommunication network 110 and stored in server(s) 149 in other networks 140. It should be noted that the foregoing are only several examples of the types of relevant application servers 114 that may be included in telecommunication network 110 for storing information relevant to providing various services to subscribers.

In accordance with the present disclosure, other networks 140 and servers 149 may comprise networks and devices of various content providers of ABR videos. In one example, each of servers 149 may also make available manifest files which describe the variants of a video and the video chunks thereof which are stored on the respective one of the servers 149. For instance, there may be several video chunks containing video and audio for the same time block (e.g., a 2-10 second portion) of the video, but which are encoded at different bitrates in accordance with an adaptive bitrate streaming protocol. Thus, an adaptive bitrate streaming video player may request and obtain any one of the different video chunks for the time block, e.g., depending upon a state of a video buffer of the adaptive bitrate streaming video player, depending upon a network bandwidth or other network conditions, depending upon the access rights of the adaptive bitrate streaming video player to different variants (e.g., to different encoding levels/bitrates) according to a subscription plan and/or for the particular video, and so forth. In one example, an adaptive bitrate streaming video player (e.g., of a test device) may also select video chunks of different variants for various time blocks of a video based upon specific instructions from test controller 115 or in accordance with a specific configuration for testing purposes.

In one example, customer premises network 160 may include a gateway 161, which receives data/communications associated with different types of media, e.g., television, phone, and Internet, and separates these communications for the appropriate devices. The data/communications may be received via access network 120 and/or via satellite receiver 139, for instance. In one example, television data is forwarded to set-top boxes (STBs)/digital video recorders (DVRs) 162A and 162B to be decoded, recorded, and/or forwarded to television (TV) 163A and TV 163B for presentation. Similarly, telephone data is sent to and received from phone 164; Internet communications are sent to and received from router 165, which may be capable of both wired and/or wireless communication. In turn, router 165 receives data from and sends data to the appropriate devices, e.g., personal computer (PC) 166, mobile devices 167A, and 167B, and so forth. In one example, router 165 may further communicate with TV (broadly a display) 163A and/or 163B, e.g., where one or both of the televisions comprise a smart TV. In one example, router 165 may comprise a wired Ethernet router and/or an Institute for Electrical and Electronics Engineers (IEEE) 802.11 (Wi-Fi) router, and may communicate with respective devices in customer premises network 160 via wired and/or wireless connections.

In one example, one or both of the STB/DVR 162A and STB/DVR 162B may comprise all or a portion of a computing device or system, such as computing system 400, and/or processing system 402 as described in connection with FIG. 4 below, specifically configured to perform various steps, functions, and/or operations in connection with examples of the present disclosure for determining a bitrate variant of a semi-annotated video. Among other functions, STB/DVR 162A and STB/DVR 162B may comprise adaptive bitrate streaming video players capable of playing adaptive bitrate streaming videos in formats such as H.264 (Advanced Video Coding (AVC)), H.265 (High Efficiency Video Coding (HEVC)), Moving Picture Expert Group (MPEG) .mpeg files, .mov files, .mp4 files, 0.3gp files, .f4f files, .m3u8 files, or the like. In addition, STB/DVR 162A and STB/DVR 162B may each comprise a test device (e.g., a receiver device/video player) for performing various operations in connection with examples of the present disclosure for determining a bitrate variant of a semi-annotated video. Although STB/DVR 162A and STB/DVR 162B are illustrated and described as integrated devices with both STB and DVR functions, in other, further, and different examples, STB/DVR 162A and/or STB/DVR 162B may comprise separate STB and DVR devices.

It should be noted that in one example, another device may provide one or more operations or functions for determining a bitrate variant of a semi-annotated video, as described herein, and may comprise an adaptive bitrate streaming video player capable of playing adaptive bitrate streaming videos (and functioning as a test device). For instance, one or more of mobile devices 157A, 157B, 167A and 167B, and/or PC 166 may also comprise all or a portion of a computing device or system, such as computing system 400, and/or processing system 402 as described in connection with FIG. 4 below, specifically configured to perform various steps, functions, and/or operations for determining a bitrate variant of a semi-annotated video, as described herein.

System 100 may also include a content distribution network (CDN) 170. In one example, CDN 170 may be operated by a different entity from telecommunication network 110. In another example, CDN 170 may be operated by a same entity as telecommunication network 110, e.g., a telecommunication service provider. In one example, the CDN 170 may comprise a collection of cache servers distributed across a large geographical area and organized in a tier structure. The first tier may comprise a group of servers that accesses content web servers (e.g., origin servers) to pull content into the CDN 170, referred to as ingestion servers, e.g., ingest server 172. The content may include videos, content of various webpages, electronic documents, video games, etc. A last tier may comprise cache servers which deliver content to end user, referred to as edge caches, or edge servers, e.g., edge server 174. For ease of illustration, a single ingest server 172 and a single edge server 174 are shown in FIG. 1. In between the ingest server 172 and edge server 174, there may be several layers of servers (omitted from the illustrations), referred to as the middle tier. In one example, the edge server 174 may be multi-tenant, serving multiple content providers, such as telecommunication network 110, content providers associated with server(s) 149 in other network(s) 140, and so forth. In one example, edge server 174 may comprise an adaptive bitrate streaming video server.

As mentioned above, TV servers 112 in telecommunication network 110 may also include one or more interactive TV/video-on-demand (VoD) servers and/or network-based DVR servers. In one example, an interactive TV/VoD server and/or DVR server may comprise all or a portion of a computing device or system, such as computing system 400, and/or processing system 402 as described in connection with FIG. 4 below, specifically configured to perform various steps, functions, and/or operations in connection with determining a bitrate variant of a semi-annotated video, as described herein. Among other things, an interactive TV/VoD server and/or network-based DVR server may function as a server for STB/DVR 162A and/or STB/DVR 162B, one or more of mobile devices 157A, 157B, 167A and 167B, and/or PC 166 operating as a client for requesting and receiving a manifest file for an adaptive bitrate streaming video, as described herein. For example, STB/DVR 162A may present a user interface and receive one or more inputs (e.g., via remote control 168A) for a selection of an adaptive bitrate streaming video. STB/DVR 162A may request the video from an interactive TV/VoD server and/or network-based DVR server, which may retrieve a manifest file for the video from one or more of the application servers 114 and provide the manifest file to STB/DVR 162A. STB/DVR 162A may then obtain video chunks of the video as identified in the manifest file.

In one example, the manifest file may direct the STB/DVR 162A to obtain the video chunks from edge server 174 in CDN 170. The edge server 174 may already store the video chunks of the video and may deliver the video chunks upon a request from the STB/DVR 162A. However, if the edge server 174 does not already have the video chunks, upon receiving the request from the STB/DVR 162A, the edge server 174 may in turn request the video chunks from an origin server. The origin server which stores chunks of the video may comprise, for example, one of the servers 149 or one of the TV servers 112. The chunks of the video may be obtained from an origin server via ingest server 172 before being passed to the edge server 174. In one example, the ingest server 172 may also pass the video chunks to other middle tier servers and/or other edge servers (not shown) of CDN 170. The edge server 174 may then deliver the video chunks to the STB/DVR 162A and may store the video chunks until the video chunks are removed or overwritten from the edge server 174 according to any number of criteria, such as a least recently used (LRU) algorithm for determining which content to keep in the edge server 174 and which content to delete and/or overwrite.

It should be noted that a similar process may involve other devices, such as TV 163A or TV 163B (e.g., "smart" TVs), mobile devices 167A, 167B, 157A or 157B obtaining a manifest file for a video from one of the TV servers 112, from one of the servers 149, etc., and requesting and obtaining video chunks of the video from the edge server 174 of CDN 170. In this regard, it should be noted that the edge server 174 may comprise a server that is closest to the requesting device geographically or in terms of network latency, throughput, etc., or which may have more spare capacity to serve the requesting device as compared to other edge servers, and so on. However, depending upon the location of the requesting device, the access network utilized by the requesting device, and other factors, the chunks of the video may be delivered via various networks, various links, and/or various intermediate devices. For instance, in one example, edge server 174 may deliver video chunks to a requesting device in the customer premises network 160 via access network 120, e.g., an ISP network. In another example, edge server 174 may deliver video chunks to a requesting device in the customer premises network 160 via telecommunication network 110 and access network 120. In still another example, edge server 174 may deliver video chunks to a requesting device such as mobile device 157A or 157B via telecommunication network 110 and wireless access network 150.

In accordance with the present disclosure, aspects of the system 100 may provide a test system (e.g., a processing system) capable of measuring performance indicators for ABR streaming videos delivered from a variety of services and over a variety of distribution channels. For example, test controller 115 may measure performance indicators for ABR videos via one or more test devices. For instance, test controller 115 may instruct test devices (e.g., STB/DVR 162A, STB/DVR 162B, PC 166, mobile devices 157A, 157B, 167A, and 167B, etc.) to download and play certain ABR videos, to apply a particular ABR switching logic to the downloading, to perform screen capture of video presented on the display screens of such devices to obtain screen capture images, to upload the screen capture images to test controller 115 or another device (such as application servers 114) and/or to compare the screen capture images to a portion of a reference copy of the video, and so forth.

In one example, test controller 115 may obtain a video to be used for testing (e.g., a test video) and may create a visual overlay on each frame comprising a frame number of the frame, which in one example, may be applied to the video before ABR encoding and/or segmentation. In one example, test controller 115 may comprise transcoders and/or packagers (e.g., HLS packagers, DASH packagers, etc.) for encoding variants/ABR tracks at different bitrates (e.g., comprising combinations of framerates and spatial resolution), for selecting time blocks for segmenting the test video and/or the variants, and for dividing the variants into chunks with defined durations in accordance with the time blocks. However, in another example, test controller 115 may not perform these functions and/or include such functionality. For instance, the performance measures being targeted by test controller 115 may involve ABR streaming via third-party services (e.g., via CDN 170 and/or via servers 149) where the operator of network 110 does not control the creation of the variants and chunks, or may involve ABR streaming where transcoders do not support the visual overlay of variant identifiers. In examples where the test controller 115 does not create the variants and/or the chunks, the test controller 115 may obtain the different chunks for each time block of the video, e.g., from one or more other network-based servers storing the chunks, for frame-by-frame comparison to a reference copy of the video, e.g., the test video with the overlaid frame numbers or another copy thereof.

In any case, test controller 115 may perform a frame-by-frame comparison of each frame of the reference copy of the video (e.g., the highest bitrate or encoding level track/variant available) to each corresponding frame (having the same frame number) from other variants to create one or more look up tables (LUTs) identifying a distance (e.g., an average pixel distance) between the frame of the reference copy and the corresponding frame of each of the variants. In one example, test controller 115 may also create manifest files for ABR videos, where the chunks may be uploaded and stored in various locations, such as TV servers 112, servers 149, CDN 170, and so on, and the manifest file may identify (e.g., via URL) where/how a player device may request to access the chunks. In another example, test controller 115 may upload the test video, the variants, and/or the chunks created therefrom to a third-party service (e.g., servers 149, CDN 170, etc.), which may store the chunks in one or more locations, create a manifest file for the video, and make the manifest file available to various endpoint devices comprising ABR video players (such as test devices comprising STB/DVR 162A, STB/DVR 162B, PC 166, mobile devices 157A, 157B, 167A, and 167B, etc.).

As mentioned above, test controller 115 may coordinate with one or more test devices to implement a test system for performing performance measures for ABR video streaming. For instance, test controller 115 may instruct test devices (e.g., STB/DVR 162A, STB/DVR 162B, PC 166, mobile devices 157A, 157B, 167A, and 167B, etc.) to download and play a certain ABR video. Test controller 115 may also instruct the test devices to use particular ABR switching logic. For example, an ABR switching logic may be different for testing as compared to what might be preferable for actual users engaged in video streaming. For instance, a test device may be instructed to obtain only chunks/variants of a certain bitrate/encoding level, which could result in buffer depletion, video stalls/rebuffering, etc.

if the bitrate level is higher than what the network distribution path(s) can support, whereas ABR switching logic designed to avoid video stalls/rebuffering might switch to a lower bitrate variant for various chunks to comply with the estimated network bandwidth and/or to maintain the buffer occupancy above a certain minimum level. However, in another example, a test device may be allowed to implement an ABR switching logic designed to provide a highest quality video possible while avoiding stalls, and the test device may obtain chunks from various variants for successive time blocks based upon the switching logic decisions. For instance, the test may be interested in the average video quality (VQ) over the entire video.

The test devices may be configured to perform screen capture of video frames presented on the display screens of such devices to obtain screen capture images. The videos (e.g., the chunks thereof) may be obtained by the test devices from telecommunication network 110, e.g., from TV servers 112, from CDN 170, and/or from servers 149, for example. In this regard, a plurality of different test paths 195-199 are illustrated in FIG. 1. For example, test path 195 may be for testing cellular-based streaming of a network provider video service, test path 196 may be for testing terrestrial-based streaming of a network provider video service, test path 197 may be for testing a terrestrial-based streaming of a $3^{rd}$ party video service via a CDN, test path 198 may be for testing a cellular-based streaming of a $3^{rd}$ party video service (without CDN distribution), test path 199 may be for testing a cellular-based streaming of a $3^{rd}$ party video service (with CDN distribution), and so on. Various other types of test paths may similarly be tested in accordance with the present disclosure. In one example, the test devices may be instructed by test device 115 to obtain video chunks from specific sources and/or via specific test paths. In another example, the test devices may select sources and/or test paths according to default player logic, e.g., selecting the closest servers, using multipath selection logic to choose cellular or non-cellular wireless paths, etc.

In one example, a test device may perform optical character recognition (OCR) on each frame to determine a frame number that is overlaid on the frame. The test device may use any available OCR algorithm in order to identify the frame number from the frame, such as: matrix matching, feature extraction, fuzzy logic, structural analysis, neural network-based techniques, and so forth. In one example, the test device may also perform a frame-by-frame comparison of each frame that is received, rendered, and/or played-out to a corresponding frame of a reference copy of the video to calculate an image distance (e.g., an average pixel distance) between the frame of the reference copy and the corresponding received frame. In addition, in one example, the test device may further compare the image distance to a plurality of image distances stored for a plurality of variants, where the plurality of image distances comprises image distances between frames of the plurality of variants having the same frame number and the frame of the reference copy having the same frame number. The test device may determine that the received frame is of a particular variant (and thus also identifying the bitrate and/or encoding level) from the closest stored image distance to the image distance that is calculated for the received frame.

In one example, the test device may notify test controller 115 of the variant/encoding level that is determined for the frame. In one example, the test device may send notifications comprising the variants/encoding levels that are determined for a plurality of received frames. In other words the test device may not send separate notifications for each received frame, but may wait until a certain number of calculations for received frames are made or may wait until the playback of the video on the test devices is finished. In one example, the test device may further determine one or more performance measures (or QoE measures), which may include a video quality (VQ), such as a spatial resolution, a frame rate, a compression artifacts measure, a pixel depth, etc., and delivery quality (DQ) measures, such as a video startup time, a video stall measure, a rate switching measure, a latency measure, etc. In one example, a performance measure may comprise a composite quality score, such as a Video Multimethod Assessment Fusion (VMAF) metric. For instance, the performance measure may comprise a score between 0 and 100 providing a quantified estimate of the QoE based upon various measured parameters.

As an alternative, or in addition, the test device may upload the screen capture images to the test controller 115, or one or more other devices, where the test controller 115 or the other device(s) may have a reference copy of the video, may calculate image distances for each received frame to corresponding frames of the reference copy, may look-up a closest image distance to determine a variant/encoding level for each received frame, and so on. In addition, in one example, test controller 115 may store the variant information associated with the received and played out ABR videos for one or more test devices, and may further determine one or more performance measures (or QoE measures).

Some of the performance measures may be calculated from the distance measure, such as the video quality. As just one example, the image distance between a frame and the frame of the reference copy may be used as a direct measure of video quality. Alternatively, or in addition, an average video quality may be taken as the average of the image distances as measured for a plurality of received frames of the video. In another example, the performance measure(s) may be determined in accordance with the variant/encoding level(s) that is/are determined for one or more of the received frames of a video. For instance, in addition to storing the image distances from each frame of each variant to the corresponding frame of the reference copy of the video, an average performance measure (such as an average video quality) for each variant may also be stored. The performance measures of one or more of the received frames may then be selected by mapping the variant/encoding level determined for the one or more of the received frames to corresponding performance measures stored for each of the variants/encoding levels. In addition, the identification of the variant/encoding level may also map to a bitrate (as well as a frame rate and a resolution (pixel density) which may be associated with the bitrate) that is also known by the test controller 115 in accordance with an ABR protocol.

As another example, the rate switching metric may identify how often the variant/encoding level is switched over the course of the entire video, or a portion thereof for which the rate switching metric is being obtained. A rate switch may be determined from one or more subsequent received frames (e.g., from a first chunk) being found to have a different bitrate (or being of a different variant/encoding level) from one or more prior received frames (e.g., from a second chunk).

The performance measures may also be stored in association with information regarding other aspects of the test system relevant to the particular test, such as: the test device and its capabilities, the test path and/or characteristics of the test path (e.g., whether the test path includes a CDN or not, whether the test path is over a cellular or non-cellular wireless link or over a terrestrial link, whether the link is a fiber optic connection or a digital subscriber line (DSL) connection, a particular $3^{rd}$ party service from which the video is obtained, etc.), the ABR switching logic used by the ABR video player of the test device, whether multi-path streaming is used by the test device, and so on. In this regard, the test controller 115 may tune aspects of the testing environment to observe variations in the performance measures, such as making changes to the target encoding bitrates for the variants, altering how the chunks are delivered over one or more networks, changing ABR video player rate-switching logic, and so on.

Further details regarding the functions that may be implemented by application servers 114, TV servers 112, ingest server 172, servers 149, STBs/DVRs 162A and 162B, TV 163A, TV 163B, mobile devices 157A, 157B, 167A and 167B, and/or PC 166 are discussed in greater detail below in connection with the examples of FIGS. 2-4. In addition, it should be noted that the system 100 may be implemented in a different form than that which is illustrated in FIG. 1, or may be expanded by including additional endpoint devices, access networks, network elements, application servers, etc. without altering the scope of the present disclosure. For example, telecommunication network 110 is not limited to an IMS network. Wireless access network 150 is not limited to a UMTS/UTRAN configuration. Similarly, the present disclosure is not limited to an IP/MPLS network for VoIP telephony services, or any particular type of broadcast television network for providing television services, and so forth.

In another example, functions described above in connection with test controller 115 may alternatively or additionally be performed by one or more other devices. For instance, one of application servers 114 may overlay frames with frame numbers. Another of the application servers 114 may transcode, segment, or otherwise process an annotated test video into a plurality of variants and/or into a plurality of chunks of each of the variants. Another of the application servers 114 may obtain a plurality of chunks for a plurality of variants of a test video from a third party service (e.g., from CDN 170 and/or from servers 149), may compare frames of each of the chunks to corresponding frames having the same frame number from a reference copy to determine an image distance for each of the frames for each of the chunks to the corresponding frame of the reference copy, may create a table of the frame numbers, variant/encoding level, and corresponding image distances, and so on. Still another of the application servers 114 may receive screen capture images from test devices, may determine frame numbers from the screen capture images, may compare the screen capture images to a frame of a reference copy having the frame number, e.g., to determine an image distance, may determine a variant/encoding level based upon the image distance, and so forth. In one example, these different operations may be coordinated by test controller 115. In addition, although test controller 115 is illustrated as a component of telecommunication network 110, in other examples, test controller 115 may be deployed in a different network, may be operated by a different entity, or both. For instance, test controller 115 may be deployed in one or more of the other networks 140 and may be used by a video streaming service to test and measure how ABR videos are delivered to video player devices.

Similarly, functions of test controller 115 may alternatively or additionally be provided by one or more of the test devices. In addition, in one example, functions of test controller 115 may alternatively or additionally be performed by a device which is locally connected to one or more of the test devices. For instance, test controller 115 may utilize test devices such as STB/DVR 162A, STB/DVR 162B, mobile devices 167A and 167B, etc. to obtain video chunks and to perform OCR on received frames of the video chunks, while PC 166 may comprise a local device to coordinate with the test devices and to assemble the information obtained therefrom under the direction of test controller 115. For instance, PC 166 may obtain from test controller 115 one or more lookup tables matching frame numbers and variants to corresponding image distances. PC 166 may also obtain from test controller 115 or from a content source (e.g., TV servers 112, CDN 170, servers 149, etc.) a reference copy of a test video. As such, PC 166 may calculate image distances, may cross-reference the image distances to image distances in the lookup table(s) to determine corresponding variants, and so on. In another example, PC 166 may perform other functions described above in connection with test controller 115, such as creating a test video and/or reference copy of a video with visual overlays of frame numbers on each frame, obtaining or creating variants and/or the chunks of the respective variants, and so on.

In one example, PC 166 may receive screen capture images from test devices such as STB/DVR 162A, STB/DVR 162B, mobile devices 167A and 167B, etc. via direct cable connections (not shown), via local network connections (e.g., within customer premises network 160) or via local wireless communications, e.g., without involvement of telecommunication network 110, access network 120, etc. PC 166 may also be configured to determine variants/encoding levels for each of the screen capture images via comparison to corresponding frames of the reference copy.

In one example, PC 166 may be further configured to calculate one or more performance measures such as a video quality, e.g., a rate switching metric, to upload the determined bitrate variants/encoding levels and/or performance measures to test controller 115, and so on. In such an example, the test devices perform the screen capture, but are unburdened from having to obtain the reference copy of the video, calculate the variant/encoding level by performing image distance calculations and comparing to the entries in the lookup table(s), and so on. In addition, in such an example, these functions are moved from a more centralized location (e.g., the test controller 115) to another device more local to the test device(s) (e.g., PC 116) which may be more efficient than uploading screen capture images from the customer premises network 160 to the telecommunication network 110. Thus, these and other modifications are all contemplated within the scope of the present disclosure.

Figure 2:
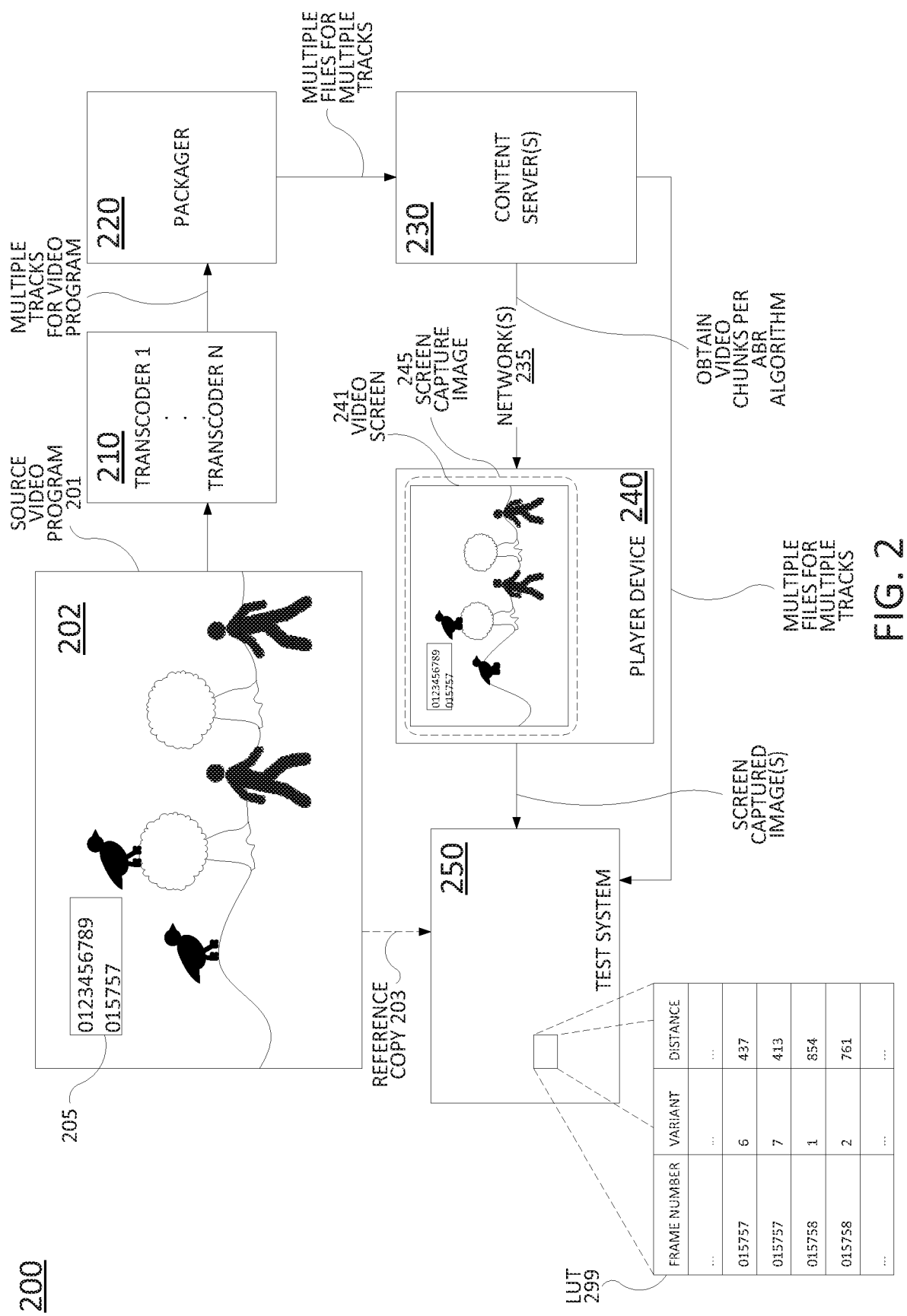
FIG. 2 illustrates an example process of encoding a source video and determining bitrate variants for frames received at a player device, in accordance with the present disclosure.

FIG. 2 illustrates an example process 200 of encoding a source video 201 and determining bitrate variants for frames received at a player device 240 in accordance with the present disclosure. As illustrated in FIG. 2, a source video 201 (e.g., a "test video") may be processed by a plurality of transcoders 210 (e.g., transcoders 1 to N). A representative frame 202 of the source video 201 is also shown in the figure and includes an overlay 205 with a frame number (e.g., frame number 015757). In one example, the overlay 205 may also include reference digits for alignment purposes (e.g., 0123456789). In one example, the reference digits may be unique to each source video. In another example, another signifier may be used instead of the reference digits, such as a unique color pattern of at least a portion of the pixels of the overlay 205, a barcode (e.g., including one dimensional barcodes and two dimensional barcodes, quick response (QR) codes, etc.).

The plurality of transcoders 210 may create a plurality of variants, or tracks, comprising copies of the source video 201 that are encoded at different target bitrates, e.g., in accordance with an adaptive bitrate streaming protocol. In addition, the plurality of transcoders 210 may provide the multiple tracks to a packager 220 (e.g., a HLS packager, a DASH packager, or the like) which may segment the tracks to create chunks representing a certain time block, and which may create a manifest file defining the different chunks. Then multiple files comprising the various chunks may be uploaded to one or more content servers 230, e.g., servers of a telecommunication service provider, of one or more CDN(s), or the like for storage and delivery to client devices/video players.

In one example, the one or more content servers 230 may create a manifest file which identifies different chunks of different variants corresponding to the various time blocks of the video. For instance, the manifest file may provide a URL for each chunk which may identify a file stored on one or more servers that is accessible via such URL and which contains the chunk. Alternatively, or in addition, the manifest file may provide a URL and a byte range for a chunk. For instance, the URL may identify a unique file stored on one or more servers that is accessible via such URL, where the file may include multiple chunks, and where the URL may further include a byte range corresponding to the chunk. For instance, an entire track or a portion of a track for a variant comprising multiple chunks may be packaged and stored as a single file.

In one example, the transcoders 210, the packager 220, and the content server(s) 230 may be operated by a same entity or a plurality of different entities. In addition, the source video 201 may be provided by a different entity. For instance, an ABR video player developer, a video content creator, a video content provider, a network operator, and so forth may be interested in testing the ABR video quality over various delivery scenarios involving different networks, different network technologies (e.g., cellular versus non-cellular wireless or wired access networks), different ABR player logic, different ABR player devices, different CDNs or video service providers, and so on, and may operate the test system 250 for such purpose. Thus, for example, such an entity may overlay frame numbers on frames of the source video 201 and upload the source video 201 to a video service provider system which may include the transcoders 210, the packager 220, and the content server(s) 230. For instance, an application running on one or more computing devices may parse the source video frame-by-frame to retrieve frame number information from metadata for each frame, and may modify certain pixels of each frame to include an overlay (e.g., a box or other spatial delineators) containing the frame number in visually-perceptible digits.

In one example, a reference copy 203 of the source video 201 may therefore be provided to the test system 250, as illustrated in FIG. 2. However, in another example, the source video 201 with frame number visual overlays may be created by the test system 250 and provided to the transcoders 210. In other words, the device(s) via which the source video 201 with frame number overlays is created may comprise a part of the test system 250.

In one example, the player device 240 may obtain the manifest file and may receive an ABR video stream by requesting video chunks for each successive time block of the video via one or more networks 235. The video chunks may be requested in accordance with an ABR algorithm that is active on the player device 240. The player device 240 may render each of the video chunks via a video screen 241.

In addition, the player device 240 may perform a screen capture to obtain screen capture images (such as illustrative screen capture image 245) from the frames of the video chunks being played. For instance, player device 240 may include a screen capture program that is executable in conjunction with the playing of the video chunks on the player device 240. In one example, the player device 240 may oversample the frames being played in video screen 241 (e.g., obtaining 40 screen capture images per second, whereas the maximum frame rate provided by the plurality of transcoders 210 may be 30 frames per second).

In one example, the player device 240 may feed the screen capture images (e.g., including screen capture image 245) to the test system 250. The test system 250 may then perform optical character recognition (OCR) on the received screen captured images (e.g., including screen capture image 245) to determine the respective frame numbers (e.g., frame number 015757 from the illustrative screen capture image 245). In addition, the test system 250 may then compare the screen capture images to corresponding frames of a reference copy of the video to determine image distances, e.g., average pixel distances, which may then be used to determine a variant for each frame via lookup table (LUT) 299.

For instance, with regard to the illustrative screen capture image 245, the test system 250 may compare the screen capture image 245 to a frame from the reference copy of the video having the same frame number (e.g., 015757) to determine an image distance (e.g., an average pixel distance). The image distance that is calculated may then be compared to the image distances in the lookup table for the frames of the different variants having the same frame number (e.g., 015757). The variant for the frame number 015757 having the closest image distance to the image distance that is calculated for the screen capture image 245 may then be identified as the variant of frame 015757 that is received and played on the player device 240. The same or a similar process may be repeated for other screen-captured video frames. As such, the test system 250 may determine the variants/encoding levels of the video frames that are received for an ABR video stream as selected by the player device 240, and as delivered over the network(s) 235.

It should be noted that the example process 200 is illustrative in nature and may be modified or performed in a number of other ways. For instance, in another example, player device 240 may obtain and store the reference copy 203, and may perform screen capture and OCR on each frame of the ABR video stream to determine a frame number, and calculate the image distance to the reference copy 203 for each frame. The player device 240 may then transmit the image distances that are calculated to the test system 250. Thus, in such an example, the player device 240 does not transmit screen capture images to the test system 250. In another example, multiple player devices may be arranged in parallel and coupled to the test system 250. For instance, the multiple player devices may obtain ABR video streams for the source video 201 but may use different ABR logic, may use different access networks and/or may obtain the frames/video chunks from different content servers and/or video service providers (e.g., different test paths), and so on. Thus, these and other modifications are all contemplated within the scope of the present disclosure.

Figure 3:
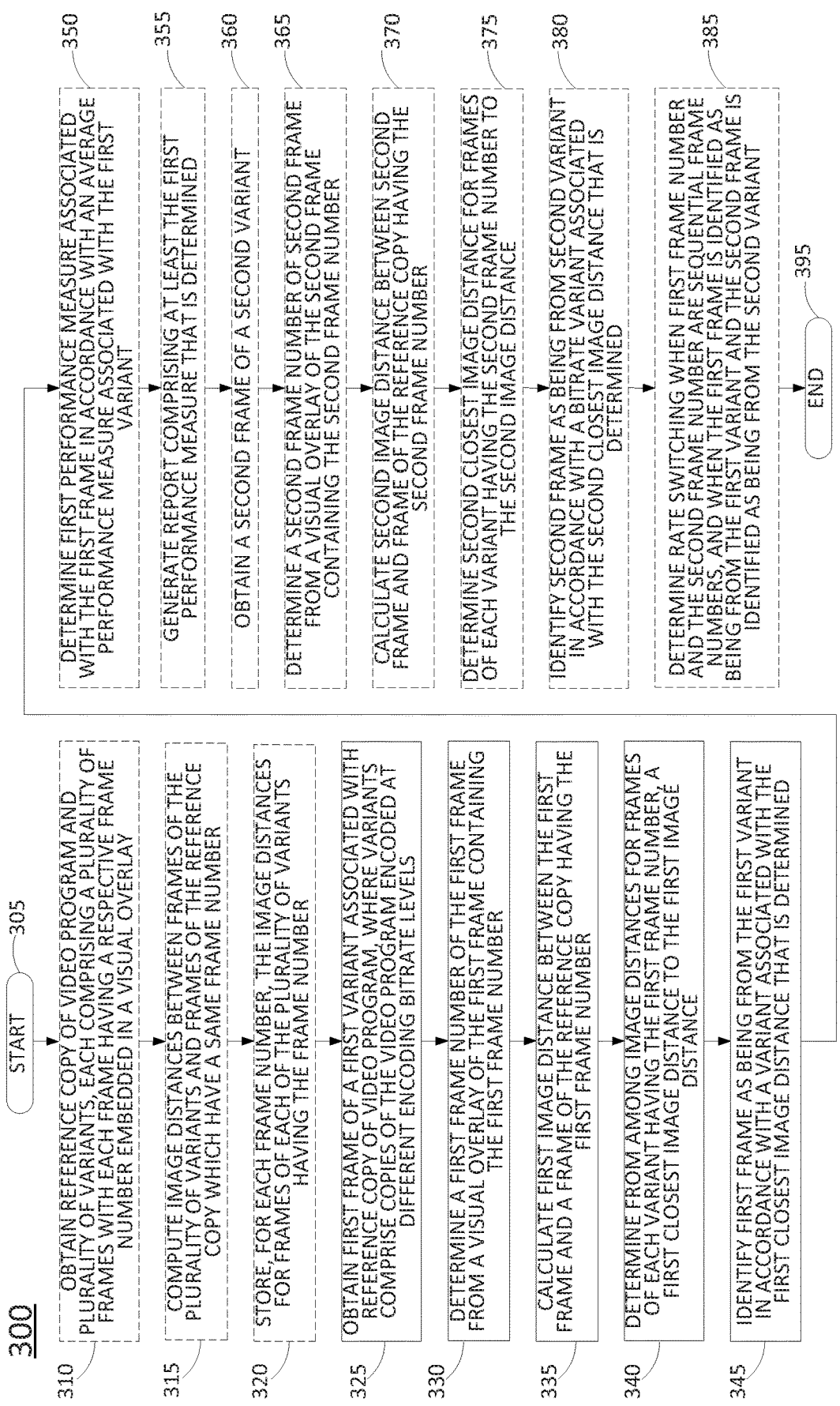
FIG. 3 illustrates a flowchart of an example method for determining a bitrate variant of a semi-annotated video, in accordance with the present disclosure.

FIG. 3 illustrates a flowchart of an example method 300 for determining a bitrate variant of a semi-annotated video, in accordance with the present disclosure. In one example, the method 300 is performed by a test system, e.g., a processing system comprising one or more devices such as illustrated in FIG. 1 or FIG. 2, e.g., test controller 115, application servers 114, TV servers 112, ingest server 172, edge server 174, one or more of servers 149, and so forth, test system 250, or any one more components thereof, such as a processing system, or by one of these devices in conjunction with other devices and/or components of system 100 of FIG. 1. For instance, the method 300 may be performed by a test system comprising test controller 115 and one or more test devices, such as STB/DVR 162A, STB/DVR 162B, one of the TVs 163A or 163B, PC 166, one of the mobile devices 157A, 157B, 167A, or 167B, and so forth. In one example, the steps, functions, or operations of method 300 may be performed by a computing device or system 400, and/or a processing system 402 as described in connection with FIG. 4 below. For instance, the computing device 400 may represent any one or more components of a test system that is/are configured to perform the steps, functions and/or operations of the method 300. For illustrative purposes, the method 300 is described in greater detail below in connection with an example performed by a processing system, such as processing system 402. The method 300 begins in step 305 and may proceed to optional step 310 or to step 325.

At optional step 310, the processing system may obtain a reference copy of a video and a plurality of variants of the video, wherein the reference copy and each of the plurality of variants comprises a plurality of frames, each of the plurality of frames having a respective frame number embedded in a visual overlay. For instance, the processing system may download various video chunks comprising the reference copy and the plurality of variants in accordance with a manifest file for the video (e.g., an ABR video where the plurality of variants comprises a plurality of copies of the video encoded at different bitrates/encoding levels). In one example, the plurality of chunks may be obtained from files stored by one or more network-based servers, e.g., in one or more television servers of a telecommunication network, in a web server, in one or more CDN servers, and so forth. In one example, the reference copy may be a variant with a highest bitrate that is available (or of the highest bitrate/encoding level that may be obtained by the processing system in connection with the performance of the method 300). In addition, the reference copy may comprise the source video or may comprise a copy of the source video that may be modified (e.g., for color correction/enhancement, noise reduction, compression, etc.) or that may be unmodified.

At optional step 315, the processing system may compute a plurality of image distances between a plurality of frames of the plurality of variants and the plurality of frames of the reference copy, wherein each of the plurality of image distances is calculated between a frame of a respective one of the plurality of variants and a frame of the reference copy which have a same frame number. For instance, in one example, each image distance may comprise an average pixel distance between a frame of one of the plurality of variants and a frame of the reference copy having the same frame number. In one example, the processing system may calculate image distances between screen capture images for each of the frames of each of the variants, and the corresponding frames of the reference copy. In one example, the average pixel distance may be calculated in accordance with a first subset of pixels of a frame of one the plurality of variants and a second subset of pixels of the frame of the reference copy having the same frame number. For instance, less than the entireties of the frames may be used for the calculation. Alternatively, or in addition, in one example, the average pixel distance may be computed in accordance with a reduced set of pixel features for the first subset of pixels of the first frame and the second subset of pixels of the frame of the reference copy having the first frame number. For instance, each pixel having information for red, green, and blue values may be reduced to one of two binary color values, e.g., a black pixel or a white pixel, which may then be used for comparison.

At optional step 320, the processing system may store, for each frame number of the plurality of frame numbers, image distances of the plurality of image distances for frames of each of the plurality of variants having the frame number. For instance, the plurality of images distances may be stored in one or more lookup tables. The lookup table(s) may include a plurality of entries, each of which may include a frame number, a variant identifier, and a respective image distance (e.g., for the frame of the variant as compared to a frame with the same frame number from the reference copy).

At step 325, the processing system obtains a first frame of a first one of the plurality of variants that is associated with the reference copy of the video. It is again noted that the plurality of variants may comprise a plurality of copies of the video encoded at different bitrates, e.g., in accordance with an ABR scheme. The frame may be part of a chunk that is obtained via the same network-based server(s) as mentioned above in connection with optional step 310 or via one or more other network-based servers. In one example, the processing system may include a player device that may obtain the first frame in accordance with ABR logic that is in operation thereon. In another example, the processing system may obtain the first frame from a player device that may obtain the first frame from the one or more network-based servers (e.g., where the processing system may not include the player device).

It should also be noted that although the terms, "first," "second," "third," etc., may be used herein, the use of these terms is intended as labels only. Thus, the use of a term such as "third" in one example does not necessarily imply that the example must in every case include a "first" and/or a "second" of a similar item. In other words, the use of the terms "first," "second," "third," and "fourth," does not imply a particular number of those items corresponding to those numerical values. In addition, the use of the term "third" for example, does not imply a specific sequence or temporal relationship with respect to a "first" and/or a "second" of a particular type of item, unless otherwise indicated. Similarly, as referred to herein, the term "first" is used simply as a label and does not imply that a segment or chunk necessarily relates to a beginning segment of a video (although in one example it could be).

At step 330, the processing system determines a first frame number of the first frame from a visual overlay of the first frame. For instance, each of the plurality of frames of the plurality of variants may contain a respective frame number in a visual overlay in at least a portion thereof, such as the example visual overlay 205 illustrated in FIG. 2. In one example, the determining of the first frame number of the first frame may comprise performing an optical character recognition OCR on at least a portion of the first frame containing the visual overlay. In one example, the OCR may be performed on a screen capture image of the first frame. In one example, the OCR is performed via a player device obtaining an ABR video stream that includes at least the first frame of the first one of the plurality of variants.

At step 335, the processing system calculates a first image distance between the first frame and a frame of the reference copy having the first frame number. For instance, in one example, the first image distance may comprise an average pixel distance between the first frame (e.g., a screen capture image of the first frame) and the frame of the reference copy having the first frame number. In one example, the average pixel distance may be calculated in accordance with a first subset of pixels of the first frame and a second subset of pixels of the frame of the reference copy having the first frame number. Alternatively, or in addition, the average pixel distance may be computed in accordance with a reduced set of pixel features for the first subset of pixels of the first frame and the second subset of pixels of the frame of the reference copy having the first frame number (e.g., a translation of red, green, and blue pixel values to black/white representations for each of the pixel to be used for the calculating of the first image distance at step 335).

At step 340, the processing system determines, from among a plurality of image distances for frames of each of the plurality of variants having the first frame number, a first closest image distance to the first image distance. For instance, the plurality of image distance for frames of each of the plurality of variants having the first frame number may be computed at optional step 315 and stored at optional step 320.

At step 345, the processing system identifies the first frame as being from the first one of the plurality of variants in accordance with a variant associated with the first closest image distance that is determined. For instance, the first frame number may be 015757 and the first image distance for the first frame that is calculated at step 335 may be 543. In addition, the image distance for frame number 015757 of "variant 4" to frame number 015757 of the reference copy may be 682 while the image distance for frame number 015757 of "variant 3" to frame number 015757 of the reference copy may be 569 and the image distance for frame number 015757 of "variant 2" to frame number 015757 of the reference copy may be 298. In such an example, the first closest image distance may be 569 for "variant 3." Thus, the first frame may be identified as being from "variant 3."

At optional step 350, the processing system may determine a first performance measure associated with the first frame in accordance with an average performance measure associated with the first one of the plurality of variants. For example, the processing system may also store a mapping (e.g., in the same lookup table(s) as the image distances or in one or more separately maintained data structures) of variant-to-average performance measure. In one example, the average performance measure may be derived from the average pixel distances between one or more frames of each of the variants and the corresponding one or more frames of the same frame number(s) from the reference copy. In one example, the first performance measure may comprise a composite quality score, such as a VMAF metric.

At optional step 355, the processing system may generate a report comprising at least the first performance measure that is determined. For instance, the report may be provided to one or more computing devices associated with telecommunication network operators, CDN operators, video content creators, video content providers, and so forth. In one example, the report may be provided to one or more automated processing systems, such as a software defined network (SDN) controller which may use the information to adjust the configuration of the telecommunication network, such as instantiating or winding down one or more content servers, allocating additional link bandwidth to video streaming, and so on. Similarly, the report may be provided to a CDN orchestrator to instantiate or wind-down one or more nodes (e.g., ingest servers, edge servers, or the like), to allocate additional storage resources to one or more nodes of the CDN, and so on. In another example, the report may be provided to one or more servers comprising transcoders and/or packagers to adjust the target bitrates/encoding levels for the different bitrate variants for the same video and/or one or more additional videos, to use more or less variants, and so forth. In still another example, the report may be provided to one or more servers which may automatically adjust ABR player logic in accordance with the first performance measure. For instance, the first performance measure may also be associated with a type of network delivery (such as via a cellular or non-cellular wireless access network) and the ABR player logic may be adjusted to use different timeouts for downloading chunks via cellular versus non-cellular accesses.

At optional step 360, the processing system may obtain a second frame of a second one of the plurality of variants. For instance, the second frame may be part of a chunk that is selected subsequent to a chunk containing the first frame by a player device in accordance with an ABR logic in operation thereon. In one example, the operations of optional step 360 may be the same as or similar to that which is described above in connection with step 325.

At optional step 365, the processing system may determine a second frame number of the second frame from a visual overlay of the second frame containing the second frame number. For instance, the operations of optional step 365 may be the same as or similar to that which is described above in connection with step 330.

At optional step 370, the processing system may calculate a second image distance between the second frame and a frame of the reference copy having the second frame number. For instance, the operations of optional step 370 may be the same as or similar to that which is described above in connection with step 335.

At optional step 375, the processing system may determine a second closest image distance of the plurality of image distances for frames of each of the plurality of variants having the second frame number to the second image distance. For instance, the operations of optional step 375 may be the same as or similar to that which is described above in connection with step 340.

At optional step 380, the processing system may identify the second frame as being from the second one of the plurality of variants in accordance with a variant associated with the second closest image distance that is determined. For instance, the operations of optional step 380 may be the same as or similar to that which is described above in connection with step 345.

At optional step 385, the processing system may determine a rate switching when the first frame number and the second frame number are sequential frame numbers, and when the first frame is identified as being from the first one of the plurality of variants and the second frame is identified as being from the second one of the plurality of variants. The first frame and second frame may be sequential when the two frames have adjacent frame numbers in a frame number sequence. In another example, the first frame and second frame may be sequential when the two frames are subsequent frames that are sampled in connection with determining variants within an ABR stream obtained by a player device. For example, since rate switching may occur at chunk boundaries (e.g., boundaries between successive time blocks), any variant determined for a time that falls within the time boundaries of one chunk may be considered to be the variant for all frames associated with that chunk and/or time block. In other words, the player device may download a chunk associated with the time block, where the chunk is of one of the plurality of variants/encoding levels. If the ABR logic determines that a higher or lower bitrate variant may be supported for the next time block, the switching may occur by selecting a chunk/variant for the next time block having the higher or lower bitrate/encoding level. Thus, the processing system may not sample every frame in connection with the performance of the method 300, but may sample every 10th frame, every 20th frame, etc., depending upon the segment/chunk duration(s), e.g., how the variants/tracks are segmented by time blocks.

Following step 345 or any of the optional steps 350-385, the method 300 may proceed to step 395 where the method ends.

It should be noted that the method 300 may be expanded to include additional steps, or may be modified to replace steps with different steps, to combine steps, to omit steps, to perform steps in a different order, and so forth. For instance, in one example the processor may repeat one or more steps of the method 300 by obtaining additional frames, determining frame numbers from visual overlays, calculating image distances to corresponding frames of the reference copy, determining variants of the respective frames in accordance with the closest image distances that are stored for the plurality of variants, and so on. In another example, the method 300 may further include determining a second performance measure associated with the second frame and generating a second report including the second performance measure. In another example, optional step 355 may be performed after optional step 380, e.g., so as to include the first performance measure and the second performance measure in the report. In still another example, the first performance measure (and/or the second performance measure) may be determined by direct comparison or measurement, e.g., as an alternative or in addition to determining a performance measure in accordance with the average performance measures associated with different variants. Thus, these and other modifications are all contemplated within the scope of the present disclosure.

In addition, although not expressly specified above, one or more steps of the method 300 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 3 that recite a determining operation or involve a decision do not necessarily require that both branches of the determining operation be practiced. In other words, one of the branches of the determining operation can be deemed as an optional step. In addition, one or more steps, blocks, functions, or operations of the above described method 300 may comprise optional steps, or can be combined, separated, and/or performed in a different order from that described above, without departing from the example embodiments of the present disclosure. Thus, the use of the term "optional step" is intended to only reflect different variations of a particular illustrative embodiment and is not intended to indicate that steps not labelled as optional steps to be deemed to be essential steps. The method 300 may also be expanded to include additional steps. Thus, these and other modifications are all contemplated within the scope of the present disclosure.

FIG. 4 depicts a high-level block diagram of a computing device or processing system specifically programmed to perform the functions described herein. For example, any one or more components or devices illustrated in FIG. 1 or described in connection with the example process 200 or example method 300 may be implemented as the system 400. As depicted in FIG. 4, the processing system 400 comprises one or more hardware processor elements 402 (e.g., a central processing unit (CPU), a microprocessor, or a multi-core processor), a memory 404 (e.g., random access memory (RAM) and/or read only memory (ROM)), a module 405 for determining a bitrate variant of a semi-annotated video, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). In accordance with the present disclosure input/output devices 406 may also include antenna elements, transceivers, power units, and so forth. Although only one processor element is shown, it should be noted that the computing device may employ a plurality of processor elements. Furthermore, although only one computing device is shown in the figure, if the process 200 or method 300 as discussed above is implemented in a distributed or parallel manner for a particular illustrative example, i.e., the steps of the above process 200 or method 300 is implemented across multiple or parallel computing devices, e.g., a processing system, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 402 can also be configured or programmed to cause other devices to perform one or more operations as discussed above. In other words, the hardware processor 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed process 200 and/or method 300. In one example, instructions and data for the present module or process 405 for determining a bitrate variant of a semi-annotated video (e.g., a software program comprising computer-executable instructions) can be loaded into memory 404 and executed by hardware processor element 402 to implement the steps, functions, or operations as discussed above in connection with the illustrative process 200 and/or method 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 405 for determining a bitrate variant of a semi-annotated video (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette, and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A method comprising:
   obtaining, by a processing system including at least one processor, a first frame of a first one of a plurality of variants associated with a reference copy of a video, wherein the plurality of variants comprises a plurality of copies of the video encoded at different bitrates;
   determining, by the processing system, a first frame number of the first frame from a visual overlay of the first frame containing the first frame number;
   calculating, by the processing system, a first image distance between the first frame and a frame of the reference copy having the first frame number;
   determining, by the processing system, from among a plurality of image distances for frames of each of the plurality of variants having the first frame number, a first closest image distance to the first image distance, wherein the plurality of image distances comprises image distances between the frames of the plurality of variants having the first frame number and the frame of the reference copy having the first frame number;
   identifying, by the processing system, the first frame as being from the first one of the plurality of variants in accordance with a variant associated with the first closest image distance that is determined;
   obtaining, by the processing system, a second frame of a second one of the plurality of variants;
   determining, by the processing system, a second frame number of the second frame from a visual overlay of the second frame containing the second frame number;
   calculating, by the processing system, a second image distance between the second frame and a frame of the reference copy having the second frame number;
   determining, by the processing system, a second closest image distance of the plurality of image distances for the frames of each of the plurality of variants having the second frame number to the second image distance;
   identifying, by the processing system, the second frame as being from the second one of the plurality of variants in accordance with a variant associated with the second closest image distance that is determined; and
   determining, by the processing system, a rate switching when the first frame number and the second frame number are sequential frame numbers, and when the first frame is identified as being from the first one of the plurality of variants and the second frame is identified as being from the second one of the plurality of variants.

2. The method of claim 1, further comprising:
   obtaining the reference copy of the video and the plurality of variants, wherein the reference copy and each of the plurality of variants comprises a plurality of frames, each of the plurality of frames having a respective frame number embedded in a visual overlay;
   computing the plurality of image distances between the plurality of frames of the plurality of variants and the plurality of frames of the reference copy, wherein each of the plurality of image distances is calculated between a frame of a respective one of the plurality of variants and a frame of the reference copy which have a same frame number; and
   storing, for each frame number of a plurality of frame numbers, image distances of the plurality of image distances for the frames of each of the plurality of variants having the frame number.

3. The method of claim 1, further comprising:
   determining a first performance measure associated with the first frame in accordance with an average performance measure associated with the first one of the plurality of variants.

4. The method of claim 3, further comprising:
   generating a report comprising at least the first performance measure that is determined.

5. The method of claim 1, wherein the determining the first frame number of the first frame comprises:
   performing an optical character recognition on at least a portion of the first frame containing the visual overlay.

6. The method of claim 1, wherein the first image distance comprises an average pixel distance between the first frame and the frame of the reference copy having the first frame number.

7. The method of claim 6, wherein the average pixel distance is calculated in accordance with a first subset of pixels of the first frame and a second subset of pixels of the frame of the reference copy having the first frame number.

8. The method of claim 7, wherein the average pixel distance is computed in accordance with a reduced set of pixel features for the first subset of pixels of the first frame and the second subset of pixels of the frame of the reference copy having the first frame number.

9. A non-transitory computer-readable medium storing instructions which, when executed by a processing system including at least one processor, cause the processing system to perform operations, the operations comprising:
   obtaining a first frame of a first one of a plurality of variants associated with a reference copy of a video, wherein the plurality of variants comprises a plurality of copies of the video encoded at different bitrates;
   determining a first frame number of the first frame;
   calculating a first image distance between the first frame and a frame of the reference copy having the first frame number;
   determining, from among a plurality of image distances for frames of each of the plurality of variants having the first frame number, a first closest image distance to the first image distance, wherein the plurality of image distances comprises image distances between the frames of the plurality of variants having the first frame number and the frame of the reference copy having the first frame number;

identifying the first frame as being from the first one of the plurality of variants in accordance with a variant associated with the first closest image distance that is determined;

obtaining a second frame of a second one of the plurality of variants;

determining a second frame number of the second frame from a visual overlay of the second frame containing the second frame number;

calculating a second image distance between the second frame and a frame of the reference copy having the second frame number;

determining a second closest image distance of the plurality of image distances for the frames of each of the plurality of variants having the second frame number to the second image distance;

identifying the second frame as being from the second one of the plurality of variants in accordance with a variant associated with the second closest image distance that is determined; and determining a rate switching when the first frame number and the second frame number are sequential frame numbers, and when the first frame is identified as being from the first one of the plurality of variants and the second frame is identified as being from the second one of the plurality of variants.

10. The non-transitory computer-readable medium of claim 9, wherein the operations further comprise:

obtaining the reference copy of the video and the plurality of variants of the video, wherein the reference copy comprises a plurality of frames having a plurality of frame numbers;

computing the plurality of image distances between the plurality of frames of the plurality of variants and the plurality of frames of the reference copy, wherein each of the plurality of image distances is calculated between a frame of a respective one of the plurality of variants and a frame of the reference copy which have a same frame number; and storing, for each frame number of a plurality of frame numbers, image distances of the plurality of image distances for the frames of each of the plurality of variants having the frame number.

11. The non-transitory computer-readable medium of claim 9, wherein the operations further comprise:

determining a first performance measure associated with the first frame in accordance with an average performance measure associated with the first one of the plurality of variants; and generating a report comprising at least the first performance measure that is determined.

12. The non-transitory computer-readable medium of claim 9, wherein the determining the first frame number of the first frame comprises:

performing an optical character recognition on at least a portion of the first frame containing the visual overlay.

13. The non-transitory computer-readable medium of claim 9, wherein the first image distance comprises an average pixel distance between the first frame and the frame of the reference copy having the first frame number.

14. The non-transitory computer-readable medium of claim 13, wherein the average pixel distance is calculated in accordance with a first subset of pixels of the first frame and a second subset of pixels of the frame of the reference copy having the first frame number.

15. The non-transitory computer-readable medium of claim 14, wherein the average pixel distance is computed in accordance with a reduced set of pixel features for the first subset of pixels of the first frame and the second subset of pixels of the frame of the reference copy having the first frame number.

16. A device comprising:

a processing system including at least one processor; and a computer-readable medium storing instructions which, when executed by the processing system, cause the processing system to perform operations, the operations comprising:

obtaining a first frame of a first one of a plurality of variants associated with a reference copy of a video, wherein the plurality of variants comprises a plurality of copies of the video encoded at different bitrates;

determining a first frame number of the first frame;

calculating a first image distance between the first frame and a frame of the reference copy having the first frame number;

determining, from among a plurality of image distances for frames of each of the plurality of variants having the first frame number, a first closest image distance to the first image distance, wherein the plurality of image distances comprises image distances between the frames of the plurality of variants having the first frame number and the frame of the reference copy having the first frame number;

identifying the first frame as being from the first one of the plurality of variants in accordance with a variant associated with the first closest image distance that is determined;

obtaining a second frame of a second one of the plurality of variants;

determining a second frame number of the second frame from a visual overlay of the second frame containing the second frame number;

calculating a second image distance between the second frame and a frame of the reference copy having the second frame number;

determining a second closest image distance of the plurality of image distances for the frames of each of the plurality of variants having the second frame number to the second image distance;

identifying the second frame as being from the second one of the plurality of variants in accordance with a variant associated with the second closest image distance that is determined; and determining a rate switching when the first frame number and the second frame number are sequential frame numbers, and when the first frame is identified as being from the first one of the plurality of variants and the second frame is identified as being from the second one of the plurality of variants.

17. The device of claim 16, wherein the determining the first frame number of the first frame comprises:

performing an optical character recognition on at least a portion of the first frame containing the visual overlay.

18. The device of claim 16, wherein the first image distance comprises an average pixel distance between the first frame and the frame of the reference copy having the first frame number.

19. The device of claim 18, wherein the average pixel distance is calculated in accordance with a first subset of pixels of the first frame and a second subset of pixels of the frame of the reference copy having the first frame number.

20. The device of claim 19, wherein the average pixel distance is computed in accordance with a reduced set of pixel features for the first subset of pixels of the first frame and the second subset of pixels of the frame of the reference copy having the first frame number.

\* \* \* \* \*